United States Patent
Nagase et al.

(10) Patent No.: US 8,689,926 B2
(45) Date of Patent: Apr. 8, 2014

(54) VEHICLE STEERING APPARATUS AND MANUFACTURING METHOD OF SAME

(75) Inventors: Shigeki Nagase, Nabari (JP); Shiro Nakano, Osaka (JP); Ken Matsubara, Matsubara (JP); Motoo Nakai, Nara (JP); Kunihiro Oka, Kashihara (JP); Naotake Kanda, Yamatokoriyama (JP); Nobuhiro Uchida, Toyota (JP); Kouya Yoshida, Toyota (JP); Minoru Sentoku, Kashiba (JP)

(73) Assignee: JTEKT Corporation, Osaka (JP)

( * ) Notice: Subject to any disclaimer, the term of this patent is extended or adjusted under 35 U.S.C. 154(b) by 796 days.

(21) Appl. No.: 12/867,399

(22) PCT Filed: Feb. 6, 2009

(86) PCT No.: PCT/JP2009/000468
§ 371 (c)(1),
(2), (4) Date: Aug. 12, 2010

(87) PCT Pub. No.: WO2009/101779
PCT Pub. Date: Aug. 20, 2009

(65) Prior Publication Data
US 2010/0314192 A1 Dec. 16, 2010

(30) Foreign Application Priority Data

Feb. 12, 2008 (JP) ................. 2008-031113
Mar. 31, 2008 (JP) ................. 2008-091655

(51) Int. Cl.
B62D 5/04 (2006.01)
(52) U.S. Cl.
USPC ............ 180/444; 180/443; 180/446

(58) Field of Classification Search
USPC .................. 180/444, 443, 446
See application file for complete search history.

(56) References Cited

U.S. PATENT DOCUMENTS 5,810,111 A 9/1998 Takeuchi et al.
6,857,500 B2 * 2/2005 Halstead et al. ............ 180/446
(Continued)

FOREIGN PATENT DOCUMENTS

EP 1 990 258 A2 11/2008
JP 8-258730 A 10/1996
(Continued)

OTHER PUBLICATIONS

European Search Report dated Sep. 17, 2012, that was issued in connection with the corresponding European patent application No. 09709984.0.

Primary Examiner — Joseph M Rocca
Assistant Examiner — Marlon Arce
(74) Attorney, Agent, or Firm — Rabin & Berdo, P.C.

(57) ABSTRACT

An electric power steering apparatus (1) comprises a control device (12), which controls driving of an electric motor (18) based on the detection signals from a rotational position-detecting sensor (72; 72A), which detects the rotational position of the rotor (64) of the electric motor (18), and a steering status detecting sensor (11; 11A). The control device (12) is housed in a housing (100) that is partitioned by a first housing (23), which is at least a portion of the motor housing (25) for the electric motor (18), and a second housing (24; 24A; 24B) that touches the first housing (23). At least one of the rotational position-detecting sensor (72; 72A) and steering state detecting sensor (11; 11A) is connected to the control device (12) by means of only a signal wire (81; 134) inside the first housing (23) or the second housing (24; 24A; 24B).

10 Claims, 11 Drawing Sheets

(56) References Cited

U.S. PATENT DOCUMENTS

| | | |
|---|---|---|
| 7,350,617 B2 * | 4/2008 | Lausser et al. ............... 180/444 |
| 7,663,273 B2 | 2/2010 | Shiino et al. |
| 7,982,347 B2 | 7/2011 | Shiino et al. |
| 8,159,098 B2 | 4/2012 | Shiino et al. |
| 2002/0060105 A1 | 5/2002 | Tominaga et al. |
| 2003/0057902 A1 | 3/2003 | Desbiolles et al. |
| 2006/0108884 A1 | 5/2006 | Shiino et al. |
| 2009/0267430 A1 | 10/2009 | Imamura et al. |
| 2010/0126794 A1 | 5/2010 | Shiino et al. |
| 2011/0266928 A1 | 11/2011 | Shiino et al. |

FOREIGN PATENT DOCUMENTS

| | | |
|---|---|---|
| JP | 2000-190856 A | 7/2000 |
| JP | 2002-120739 A | 4/2002 |
| JP | 2002-345211 A | 11/2002 |
| JP | 2003-209992 A | 7/2003 |
| JP | 2003-299290 A | 10/2003 |
| JP | 2004-135492 A | 4/2004 |
| JP | 2005-348518 A | 12/2005 |
| JP | 2006-168705 A | 6/2006 |
| WO | WO 2007/026894 A1 | 3/2007 |

* cited by examiner

FIG. 5
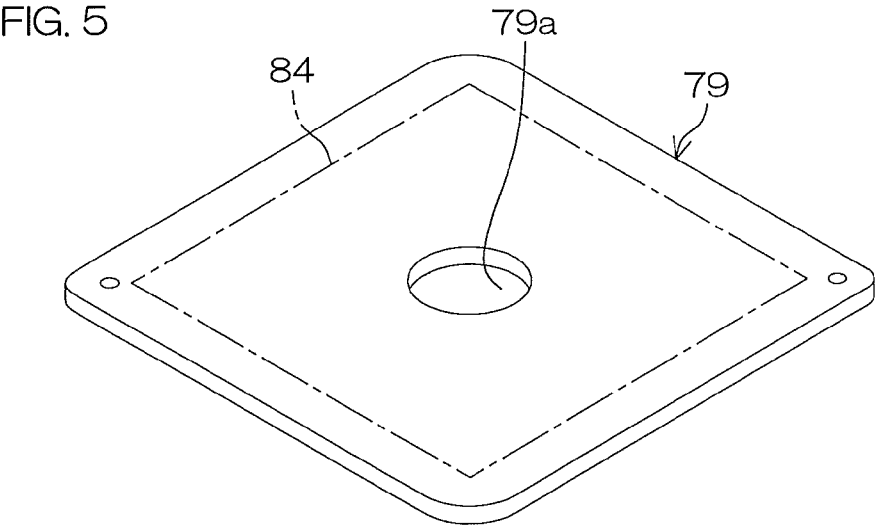
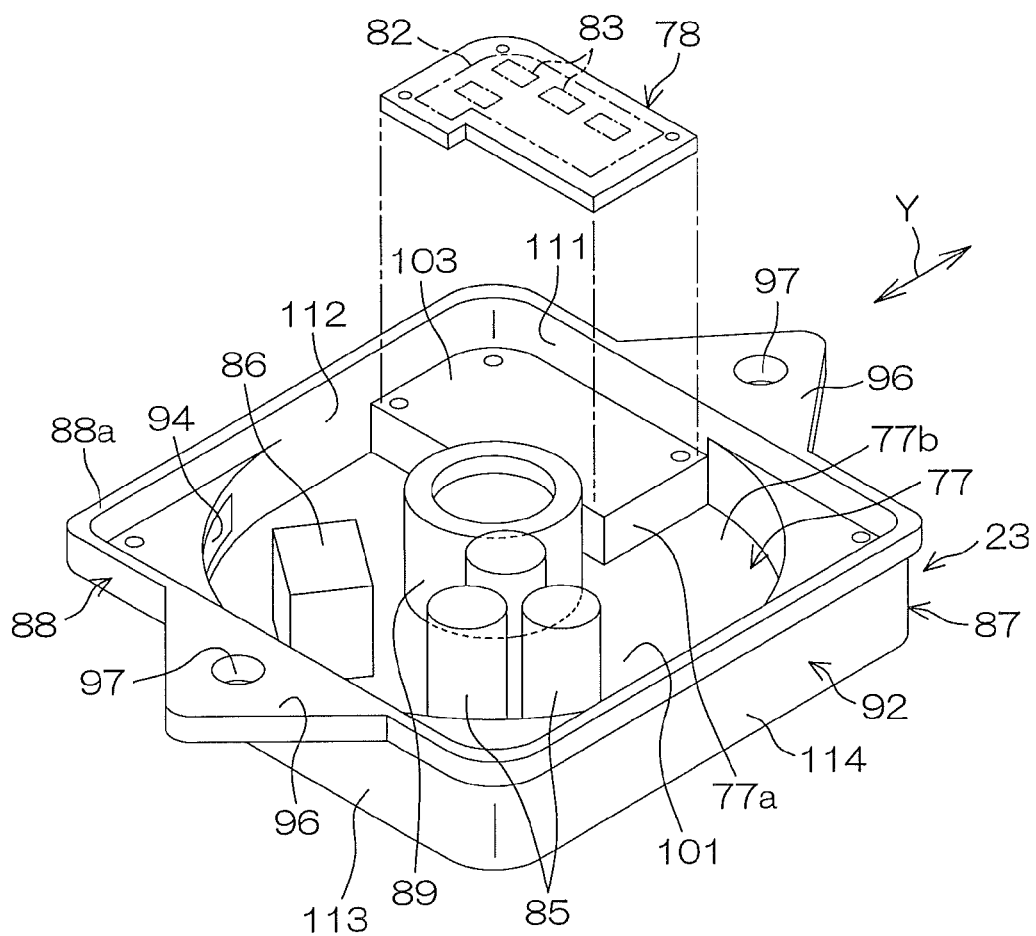

VEHICLE STEERING APPARATUS AND MANUFACTURING METHOD OF SAME

TECHNICAL FIELD

The present invention relates to a vehicle steering apparatus and a method for manufacturing the same.

BACKGROUND ART

Electric power steering apparatus serving as vehicle steering apparatus assist drivers in steering by electric motors. More specifically, various types of sensors and others detect the steering states of steering members, for example, and control devices control electric motors based on the results of the detection of the steering states so that steering assist forces are applied to steering mechanisms.

It has been proposed that a control device is arranged between an electric motor and a speed reduction mechanism in an axial direction of the electric motor (see, e.g., Patent Documents 1 to 3).

In the electric power steering apparatus discussed in Patent Document 1, there is provided, between a motor housing in the electric motor and a gear housing in the speed reduction mechanism, a circuit case separate from both the housings, and the circuit case houses the control device.

In the electric power steering apparatus discussed in Patent Document 2, a motor case in the electric motor includes a case on the motor main body side and a case on the substrate side connected to a gear housing, and a controller accommodation chamber is defined between the case on the substrate side and the gear housing.

In the electric power steering apparatus discussed in Patent Document 3, a common case is interposed between a motor housing and a gear housing. A motor chamber is defined between the case and the motor housing, and a controller accommodation chamber is defined between the case and the gear housing.

[Patent Document 1] JP 2002-120739 A
[Patent Document 2] JP 2004-135492 A
[Patent Document 3] JP 2000-190856 A

DISCLOSURE OF THE INVENTION

Problems to be Solved by the Invention

In the electric power steering apparatus discussed in Patent Document 1, the circuit case is interposed between the motor housing and a gear case. Therefore, the electric power steering apparatus increases in size in the axial direction of the electric motor. Thus, the electric power steering apparatus may interfere with another component when mounted on a vehicle.

In the electric power steering apparatus discussed in Patent Documents 2 and 3, a motor with a brush is used as an electric motor, and no rotational position detecting sensor is provided.

On the other hand, when a wiring in a rotational position detecting sensor or the like is connected to a control device via an external wiring of a housing, a wiring member for the external wiring is required, and a path length is increased. Therefore, the electric power steering apparatus is easily affected by radio noise.

Means for Solving the Problems

The present invention is directed to providing a vehicle steering apparatus that uses a blushless motor as an electric motor, enables a wiring structure to be simplified, and is small in size and superior in properties for loading in a vehicle, and a method for manufacturing the vehicle steering apparatus.

According to an aspect of the present invention, a vehicle steering apparatus comprises an electric motor composed of a blushless motor including a rotor and a stator, a rotational position detecting sensor that detects the rotational position of the rotor, a steering state detecting sensor for detecting a steering state, a control device that controls the driving of the electric motor based on respective detection signals from the rotational position detection sensor and the steering state detecting sensor, and an accommodation chamber that accommodates the control device. The accommodation chamber is defined by a first housing that is at least a part of a motor housing in the electric motor and a second housing that contacts the first housing. At least one of the rotational position detecting sensor and the steering state detecting sensor is connected to a control device via only a signal wire in the first housing or the second housing.

According to the present embodiment, the first housing that is a part of the motor housing and the second housing that contacts the first housing constitute the accommodation chamber in the control device. More specifically, no other housing is interposed between the first and second housings. The vehicle steering apparatus can be miniaturized. This results in superior properties for loading in the vehicle. Moreover, at least one of the rotational position detecting sensor and the steering state detecting sensor and the control device are connected to each other via only the internal signal wire. Therefore, the vehicle steering apparatus is less easily affected by radio noise than in a conventional case where an external wiring having a large path length is used. The number of wiring members for external wiring can be reduced, so that a wiring structure can be simplified.

The first housing may include a first interior wall surface that partially partitions the accommodation chamber, the second housing may include a second interior wall surface that partially partitions the accommodation chamber, the first interior wall surface and the second interior wall surface may be opposite to each other in an axial direction of a rotatable shaft in the electric motor, and the rotational position detecting sensor may be arranged between the rotor and the second interior wall surface in the axial direction of the rotatable shaft in the electric motor.

In this case, the rotational position detecting sensor is arranged between the rotor in the electric motor and the second interior wall surface (corresponding to an inner bottom surface) in the second housing in the axial direction of the rotatable shaft in the electric motor. Therefore, the rotational position detecting sensor can be arranged closer to the control device. As a result, the rotational position detecting sensor and the control device can be easily connected to each other by the internal signal wire (e.g., a bus bar) having a small path length. Therefore, the vehicle steering apparatus is less easily affected by radio noise than in a conventional case where an external wiring having a large path length is used. The number of wiring members for the external wiring can be reduced.

The second housing may be a part of a housing that houses a transmission mechanism that transmits the power of the electric motor to a steering mechanism. The control device usually includes a heat generation element such as a switching element mounted on the power substrate. On the other hand, the transmission mechanism hardly generates heat. The heat from the heat generation element can be effectively released from the interior of the accommodation chamber to the outside via the housing that houses the transmission mechanism.

The transmission mechanism may include a driving member and a driven member that is driven by the driving member, the vehicle steering apparatus may further include a joint that coaxially connects the rotatable shaft in the electric motor and the driving member in the transmission mechanism, the control device may include a control substrate having a control circuit for controlling a power circuit for driving the electric motor mounted thereon, and at least respective parts of the control substrate and the joint overlap each other in a direction along a central axis of the rotatable shaft in the electric motor. In this case, the respective parts of the control substrate and the joint overlap each other in a direction along the central axis of the rotatable shaft in the electric motor, so that the vehicle steering apparatus can be made smaller in size.

The second housing may be a part of a sensor housing that houses a steering state detecting sensor for detecting a steering state. In this case, the heat from the heat generation element such as the switching element can be effectively released from the interior of the accommodation chamber to the outside via the sensor housing that houses the steering state detecting sensor.

The signal wire from the steering state detecting sensor may be connected to the control device within the accommodation chamber via the inside of the sensor housing. In this case, the steering state detecting sensor and the control device can be easily connected to each other by the internal signal wire (e.g., a bus bar) having a small path length. Therefore, the vehicle steering apparatus is less easily affected by radio noise than in a conventional case where the external wiring having a large path length is used. The number of wiring members for the external wiring can be reduced, so that a wiring structure can be simplified.

The vehicle steering apparatus may further include a holding unit that holds the steering state detecting sensor, in which the holding unit may include a main body arranged within the accommodation chamber, and a holding section that extends from the main body to a detection position via a holding hole that pass through the second interior wall surface, and the steering state detecting sensor and the signal wire from the steering state detecting sensor may be held in the holding section. In this case, work for containing the main body of the holding unit in the accommodation chamber and work for inserting the holding section that holds the steering state detecting sensor and the signal wire into the holding hole can be simultaneously performed, resulting in significantly easy assembling work.

The steering state detecting sensor and the signal wire may be resin molded by the holding section. In this case, the steering state detecting sensor and the signal wire such as a bus bar are resin molded to form the holding section. Therefore, the holding unit, which is superior in positional accuracy and is easy to handle, in the steering state detecting sensor can be realized. Insert molding is used so that the manufacturing is easy.

The control device may be arranged around a central axis of the rotatable shaft in the electric motor or an extension of the central axis. In this case, a space within the accommodation chamber can be effectively used to arrange the control device and thus, the vehicle steering apparatus can be made smaller in size in the axial direction of the rotatable shaft in the electric motor.

A sub-assembly may include the control device and a first housing, the first housing may house at least a part of the control device, and an opening section that faces the control device may be formed in the first housing in the sub-assembly when the first housing is removed from the second housing. In this case, the first housing can be assembled as a sub-assembly obtained by unitizing the first housing and the control device before the first housing is incorporated into the electric motor, resulting in improved assembling efficiency.

The first housing may include a partition wall that partitions the accommodation chamber and a motor chamber in the electric motor, and a cylindrical section that projects into the accommodation chamber from the partition wall, the rotatable shaft in the electric motor is inserted through the cylindrical section, and the rotational position detecting sensor may include a rotational position detecting sensor that is arranged within the cylindrical section. In this case, it is possible to adjust the rotational position detecting sensor in the state of the sub-assembly.

A method for manufacturing an electric power steering apparatus may include the steps of transferring a unit including the above-mentioned sub-assembly, and a cover that covers the opening section in the first housing in the sub-assembly, and removing the cover from the sub-assembly in the transferred unit before the first housing in the sub-assembly is assembled into the second housing. In this case, the control device can be protected while the sub-assembly is being transferred.

BRIEF DESCRIPTION OF THE DRAWINGS

FIG. 5 is an exploded perspective view of a first housing and components in an ECU housed therein.

DESCRIPTION OF SYMBOLS

Figure 1:
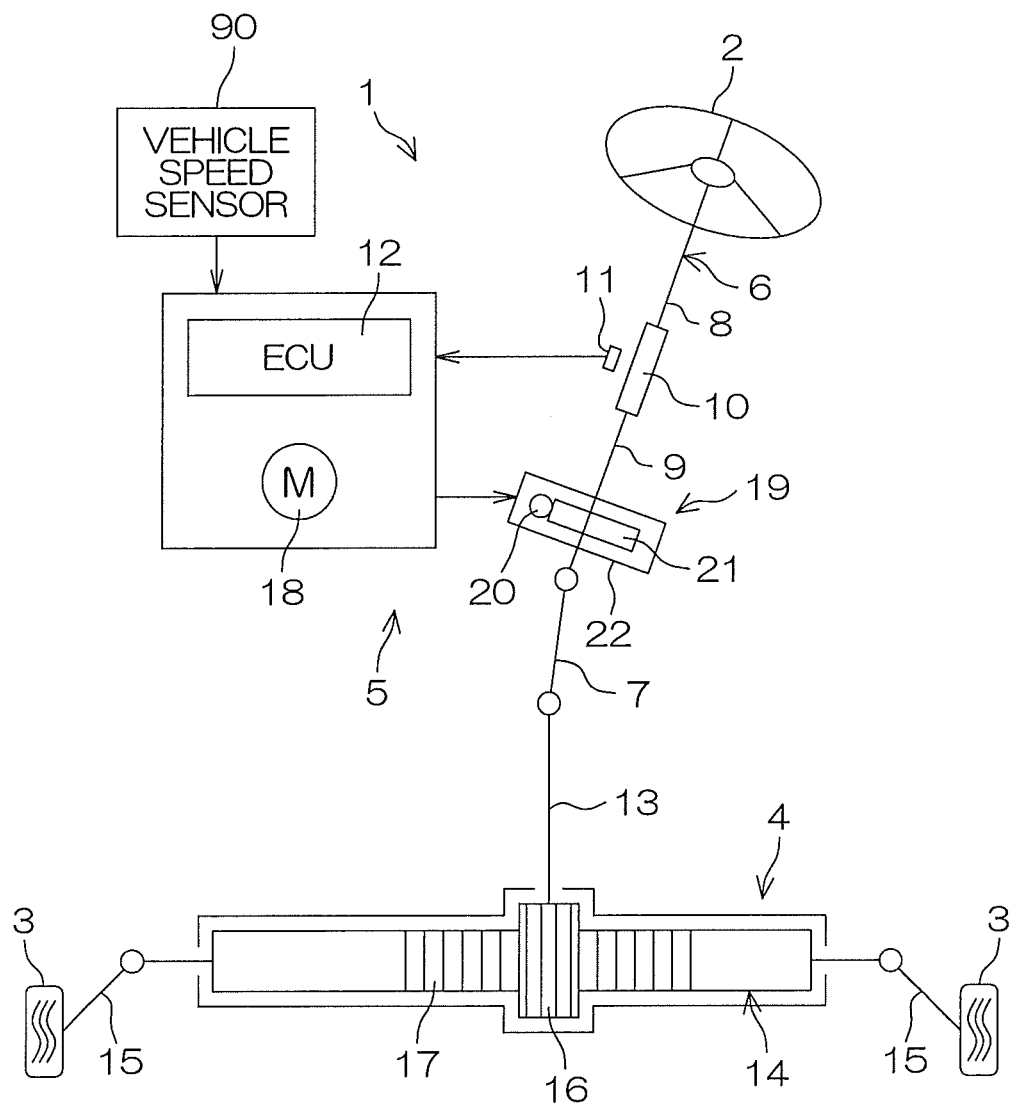
FIG. 1 is a schematic view illustrating the schematic configuration of an electric power steering apparatus serving as a vehicle steering apparatus according to an embodiment of the present invention.

1 . . . electric power steering apparatus (vehicle steering apparatus), 4 . . . steering mechanism, 5 . . . steering assist mechanism, 6 . . . steering shaft, 11 and 11A . . . torque sensor (steering state detecting sensor), 12 . . . ECU (control device), 18 . . . electric motor, 19 . . . speed reduction mechanism (transmission mechanism), 20 . . . worm shaft (driving member), 21 . . . worm wheel (driven member), 22 . . . gear housing (housing that houses transmission mechanism), 22A . . . part of gear housing (part of housing that houses transmission mechanism), 23 . . . first housing, 24, 24A, and 24B . . . second housing, 25 . . . motor housing, 26 . . . motor housing main body, 35, 35A, and 35B . . . sensor housing (housing that houses steering state detecting sensor), 37 . . . rotatable shaft, 38 . . . joint, 64 . . . rotor (of electric motor), 65 . . . stator (of electric motor), 70 . . . motor chamber, 72 and 72A . . . rotational position detecting sensor, 78 . . . power substrate, 79 . . . control substrate, 82 . . . power circuit, 82A . . . part of power circuit, 84 . . . control circuit, 84A . . . part of control circuit, H . . . housing, 100 . . . accommodation chamber, 101 . . . first interior wall surface, 102 . . . second interior wall surface, 108 . . . cover, X1 . . . axial direction (of rotatable shaft), C1 . . . central axis, C2 . . . extension (of central axis), SA . . . sub-assembly, 130 . . . holding unit, 131 . . . main body, 132 . . . holding section, 133 . . . holding hole, 134 . . . signal wire.

BEST MODE FOR CARRYING OUT THE INVENTION

Referring to the drawings, embodiments of the present invention will be specifically described.

FIG. 1 is a schematic view illustrating the schematic configuration of an electric power steering apparatus 1 serving as a vehicle steering apparatus according to an embodiment of the present invention.

Referring to FIG. 1, the electric power steering apparatus 1 includes a steering wheel 2 serving as a steering member, a steering mechanism 4 for steering steerable wheels 3 in synchronization with the rotation of the steering wheel 2, and a steering assist mechanism 5 for assisting a driver in steering. The steering wheel 2 and the steering mechanism 4 are mechanically connected to each other via a steering shaft 6 and an intermediate shaft 7.

Although in the present embodiment, the steering assist mechanism 5 applies an assist force (a steering assist force) to the steering shaft 6, the present invention can be applied to a configuration in which the steering assist mechanism 5 applies a assist force to a pinion shaft, described below, and a configuration in which the steering assist mechanism 5 applies an assist force to a rack shaft, described below.

The steering shaft 6 linearly extends. The steering shaft 6 includes an input shaft 8 connected to the steering wheel 2 and an output shaft 9 connected to an intermediate shaft 7. The input shaft 8 and the output shaft 9 are coaxially connected to each other relatively rotatably via a torsion bar 10. More specifically, when a steering torque having a predetermined value or more is input to the steering wheel 2, the input shaft 8 and the output shaft 9 rotate in the same direction while rotating relative to each other.

A torque sensor 11 serving as a steering state detecting sensor arranged around the steering shaft 6 detects a steering torque input to the steering wheel 2 based on an amount of relative rotational displacement of the input shaft 8 and the output shaft 9. The result of the torque detection by the torque sensor 11 is input to an electronic control unit (ECU) 12 serving as a control device. The result of vehicle speed detection from a vehicle speed sensor 90 is input to the ECU 12. The intermediate shaft 7 connects the steering shaft 6 and the steering mechanism 4 to each other.

The steering mechanism 4 is composed of a rack-and-pinion mechanism including a pinion shaft 13 and a rack shaft 14 serving as a steered shaft. The steerable wheel 3 is connected to each of ends of the rack shaft 14 via a tie rod 15 and a knuckle arm (not illustrated).

The pinion shaft 13 is connected to the intermediate shaft 7. The pinion shaft 13 rotates together with the steering of the steering wheel 2. A pinion 16 is provided at a tip end (a lower end in FIG. 1) of the pinion shaft 13.

The rack shaft 14 linearly extends in a right-and-left direction of an automobile. A rack 17, which meshes with the pinion 16, is formed halfway in an axial direction of the rack shaft 14. The pinion 16 and the rack 17 convert the rotation of the pinion shaft 13 into the axial movement of the rack shaft 14. The rack shaft 14 is moved in the axial direction so that the steerable wheels 3 can be steered.

When the steering wheel 2 is steered (rotated), the rotation is transmitted to the pinion shaft 13 via the steering shaft 6 and the intermediate shaft 7. The pinion 16 and the rack 17 convert the rotation of the pinion shaft 13 into the axial movement of the rack shaft 14. Thus, the steerable wheels 3 are steered.

The steering assist mechanism 5 includes an electric motor 18 for steering assist and a speed reduction mechanism 19 serving as a transmission mechanism for transmitting an output torque of the electric motor 18 to the steering mechanism 4. Examples of the speed reduction mechanism 19 include a skew gear mechanism such as a worm gear mechanism and a parallel gear mechanism. In the present embodiment, the worm gear mechanism is used as the speed reduction mechanism 19. More specifically, the speed reduction mechanism 19 includes a worm shaft 20 serving as a driving gear (a member that drives the transmission mechanism) and a worm wheel 21 serving as a driven gear (a member that is driven by the transmission mechanism), which meshes with the worm shaft 20. The speed reduction mechanism 19 is housed in a gear housing 22 serving as a transmission mechanism housing.

A rotatable shaft (not illustrated) in the electric motor 18 is connected to the worm shaft 20 via a joint (not illustrated). The electronic motor 18 drives to rotate the worm shaft 20. The worm wheel 21 is connected to the steering shaft 6 together rotatably. The worm shaft 20 drives to rotate the worm wheel 21.

When the electric motor 18 drives to rotate the worm shaft 20, the worm shaft 20 drives to rotate the worm wheel 21, and the worm wheel 21 and the steering shaft 6 together rotate. The rotation of the steering shaft 6 is transmitted to the pinion shaft 13 via the intermediate shaft 7. The rotation of the pinion shaft 13 is converted into the axial movement of the rack shaft 14. Thus, the steerable wheels 3 are steered. More specifically, the electric motor 18 drives to rotate the worm shaft 20 so that the steerable wheels 3 are steered.

The electric motor 18 is controlled by the ECU 12. The ECU 12 controls the electric motor 18 based on the result of torque detection from the torque sensor 11, the result of vehicle speed detection from the vehicle speed sensor 90, and so on. More specifically, the ECU 12 carries out control to use a map storing for each vehicle speed a relationship between a torque and a target assist amount to determine the target assist amount and bring an assist force generated by the electric motor 18 closer to the target assist amount.

Figure 2:
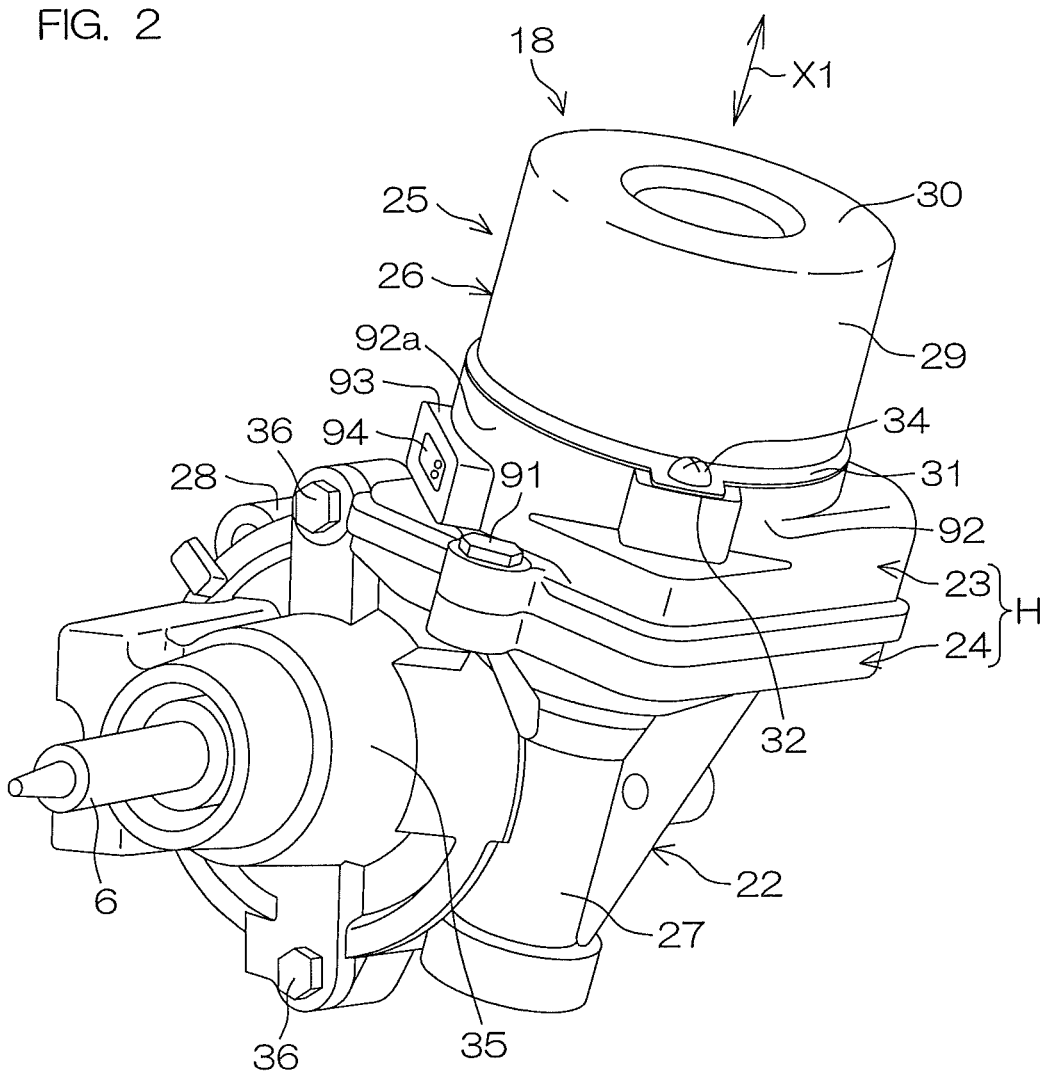
FIG. 2 is a schematic perspective view of a steering assist mechanism.
Figure 3:
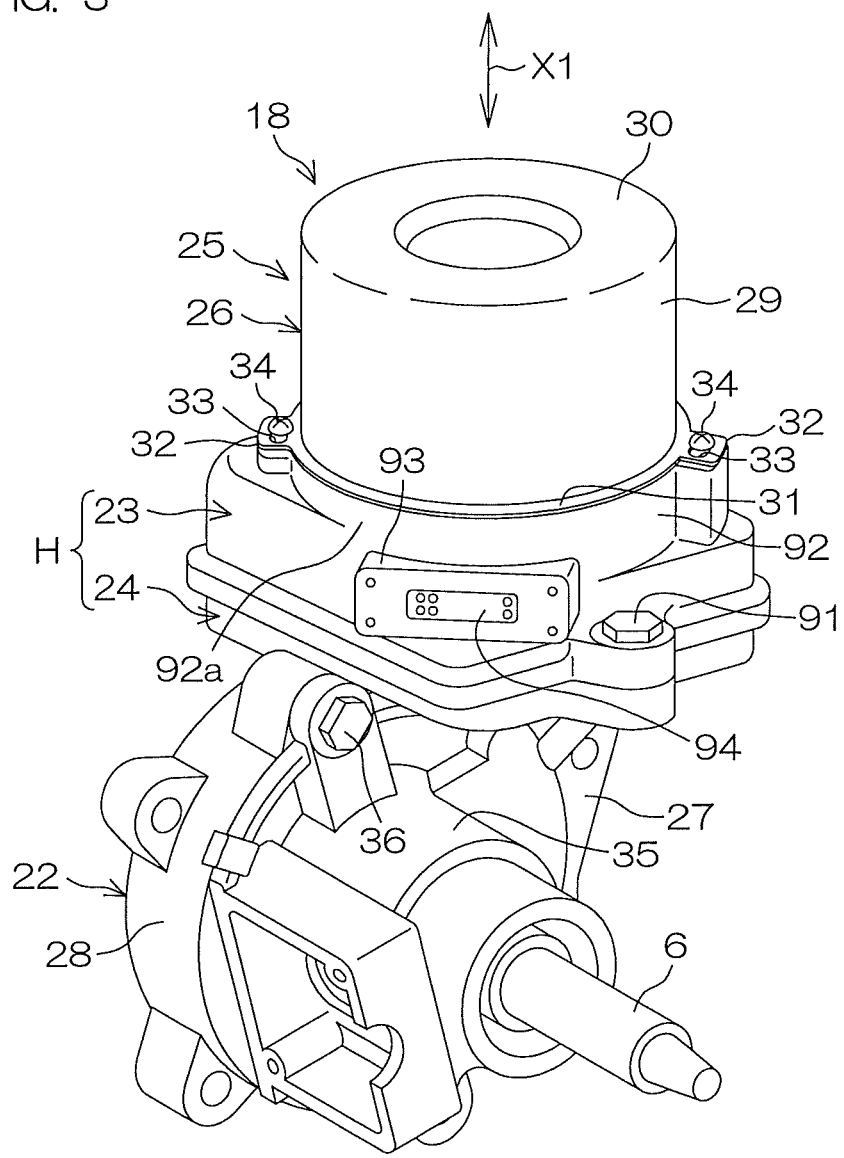
FIG. 3 is a schematic perspective view of the steering assist mechanism, as viewed from an angle different from that illustrated in FIG. 2.

FIGS. 2 and 3 are respectively schematic perspective views of the steering assist mechanism 5, as viewed from different angles. The present embodiment is mainly characterized in that a housing H for housing the ECU 12 serving as the control device includes a first housing 23 and a second housing 24, which contact each other (e.g., a state where their respective end surfaces abut on each other or a state where their respective ends are fitted to each other), as illustrated in FIGS. 2 and 3.

More specifically, the first housing 23 and the second housing 24, which constitute the housing H for housing the ECU 12, are in contact with each other. More specifically, the first housing 23 and the second housing 24 directly engage with each other, and no other housing is interposed between both the housings 23 and 24. This results in significant miniaturization.

Each of the first housing 23 and the second housing 24 is formed in a substantially square box shape whose one end opens. The respective ends of the first and second housings 23 and 24 abut on each other, and are fastened to each other by a fixing screw 91.

On the other hand, a motor housing 25 in the electric motor 18 includes a cylindrical motor housing main body 26 and the above-mentioned first housing 23. More specifically, the first housing 23 that is a part of the housing H for housing the ECU 12 is formed of a single material integrally with at least a part of the motor housing 25 in the electric motor 12. In other words, at least a part of the motor housing 25 and a part of the housing H for housing the ECU 12 are combined with each other.

The gear housing 22 includes a cylindrical driving gear housing 27 that houses the worm shaft 20, a cylindrical driven gear housing 28 that houses the worm wheel 21, and the above-mentioned second housing 24. More specifically, the second housing 24 that is a part of the housing H for housing the ECU 12 is formed of a single material integrally with the driving gear housing 27 and the driven gear housing 28 in the gear housing 22. In other words, a part of the gear housing 22 and a part of the housing H for housing the ECU 12 are combined with each other.

A cylindrical projection 93 is formed on the outer periphery 92a of an outer peripheral wall 92 serving as a sidewall of the first housing 23, and an electric connector 94 facing the outside of the first housing 23 is arranged within the cylindrical projection 93. The electric connector 94 is provided with a terminal for supplying power from a battery to the ECU 12 or a terminal for inputting and outputting a signal from the exterior, which is not illustrated.

Figure 4:
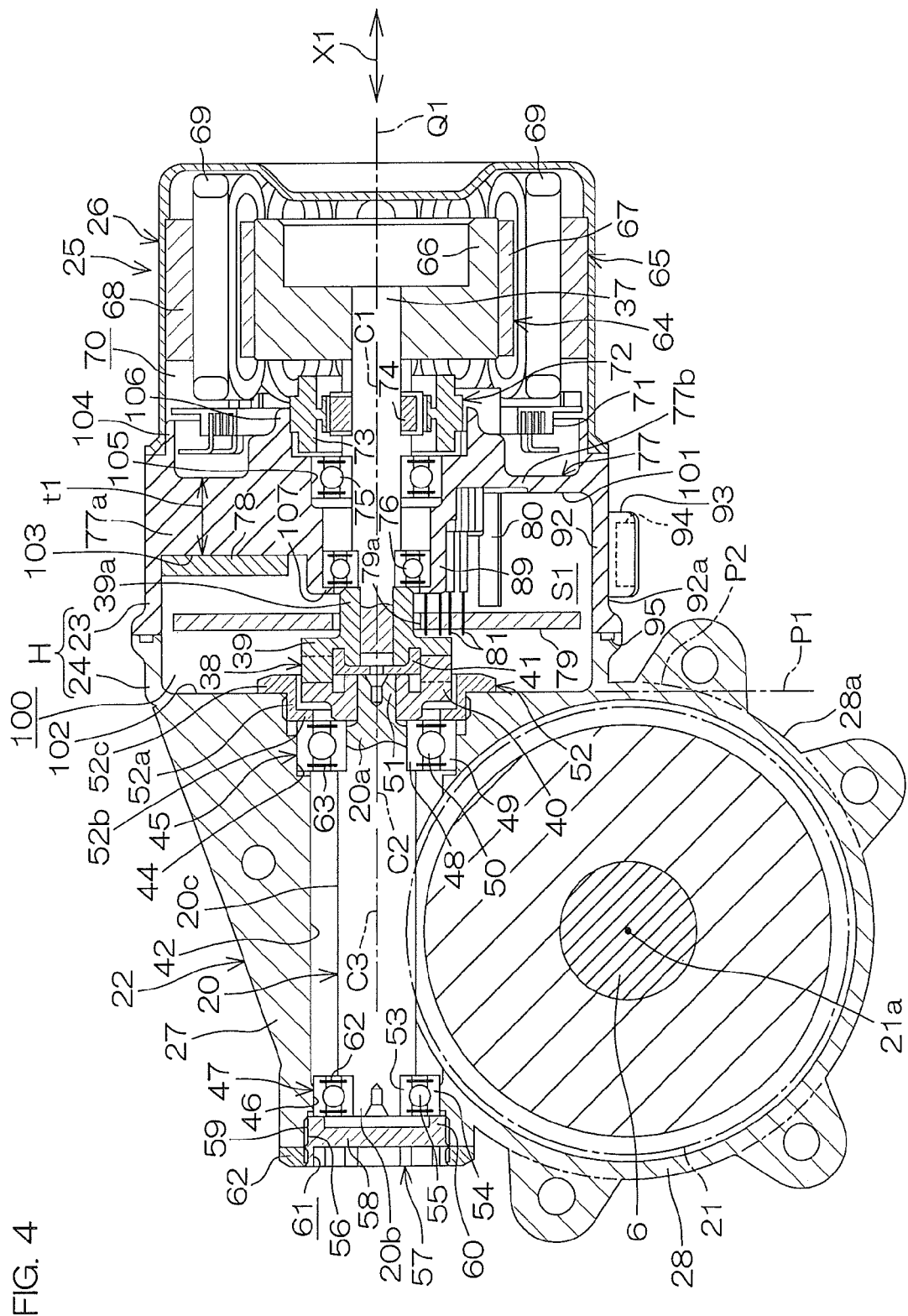
FIG. 4 is an illustrative sectional view of the steering assist mechanism, cut in an axial direction of an electric motor.
Figure 6:
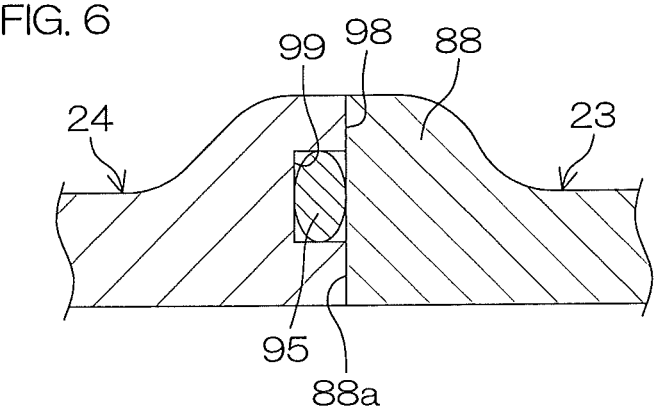
FIG. 6 is an enlarged view of a principal part of FIG. 4.

Referring to FIG. 4, which is a cross-sectional view of a principal part of the electric power steering apparatus 1, the worm wheel 21 serving as a driven member of the speed reduction mechanism 19 (transmission mechanism) and the electric connector 94 are arranged on the same side of a plane Q1 including a central axis C3 of the worm shaft 20 serving as a driving member of the speed reduction mechanism 19 (transmission mechanism) and parallel to a central axis 21a of the worm wheel 21. In this case, the electric connector 94 and the driven gear housing 28 project toward the same side, as viewed in an axial direction X1 of the rotatable shaft 37 in the electric motor 18. This enables substantial miniaturization and space saving, resulting in improvement in properties for loading in a vehicle.

Referring to FIG. 3, the electric power steering apparatus 1 is laid out so that at least respective parts of the electric connector 94 and the driven gear housing 28 overlap each other, as viewed in the axial direction X1 of the rotatable shaft 37, described below, in the electric motor 18. This enables substantial miniaturization and space saving, resulting in improvement in properties for loading in the vehicle.

The electric power steering apparatus 1 is laid out so that at least respective parts of the electric connector 94 and a sensor housing 35 overlap each other, as viewed in the axial direction X1 of the rotatable shaft 37. This enables substantial miniaturization and space saving, resulting in improvement in properties for loading in the vehicle.

The first housing 23 in the motor housing 25 is formed of an aluminum alloy (e.g., a casting or a cold forging), so that the steering assist mechanism 5 is made lightweight. The gear housing 22 including the driving gear housing 27, the driven gear housing 28, and the second housing 24 is formed of an aluminum alloy (e.g., a casting or a cold forging), for example, so that the steering assist mechanism 5 is made lightweight. A non-magnetic sheet metal, for example, is used for the motor housing main body 26 in the motor housing 25.

The motor housing main body 26 includes a cylindrical peripheral wall 29, a bottom wall 30 for closing one end of the peripheral wall 29, and an annular flange 31 that protrudes radially outward from the other end of the peripheral wall 29.

A bracket 32 that protrudes radially outward from a part in a circumferential direction of the annular flange 31. A fixing screw 34 inserted through a screw insertion hole 33 in a bracket 32 is screwed into a screw hole in the first housing 23 so that the motor housing main body 26 and the first housing 23 are integrally fixed to each other. The screw insertion hole 33 is formed into a long hole extending in a circumferential direction of the motor housing main body 26 so that a position in the circumferential direction of the motor housing main body 26 can be adjusted for the first housing 23.

The first housing 23 and the second housing 24, which constitute the housing H for housing the ECU 12, are fixed to each other using a fixing screw 91.

A cylindrical sensor housing 35 that houses the torque sensor 11 is connected to the driven gear housing 28 in the gear housing 22. The driven gear housing 28 and the sensor housing 35 are fixed to each other using a fixing screw 36. The steering shaft 6 is inserted through the cylindrical driven gear housing 28 and the sensor housing 35.

Referring to FIG. 4, the first housing 23 serving as the motor housing 25 in the electric motor 18 and the second housing 24 that contacts the first housing 23 constitute an accommodation chamber 100 that accommodates the ECU 12 serving as the control device. The respective end surfaces of the first housing 23 and the second housing 24 abut on each other, and an annular sealing member 95 seals an area between the end surfaces.

The sealing member 95 is housed in an annular groove 99 formed on an end surface 98 of either one of the first and second housings 23 and 24, e.g., the second housing 24, and is in contact with an end surface of the other housing, e.g., the first housing 23 (corresponding to an end surface 88a of a flange 88). An O ring, for example, can be used as the sealing member 95.

Referring to FIG. 4 again, the first housing 23 includes a first interior wall surface 101 that partially partitions the accommodation chamber 100. The second housing 24 includes a second interior wall surface 102 that partially partitions the accommodation chamber 100. The first interior wall surface 101 and the second interior wall surface 102 are opposite to each other in the axial direction X1 of the rotatable shaft 37 in the electric motor 18.

The second interior wall surface 102 in the second housing 24 is formed of an annular plane, and the annular plane is perpendicular to a central axis C1 of the rotatable shaft 37 in the electric motor 18 or an extension C2 of the central axis C1 (usually matched with the central axis C3 of the worm shaft 20) and surrounds the central axis C1 or the extension C2.

An extension surface P1 of the annular plane forming the second interior wall surface 102 intersects, as illustrated in FIG. 4, or contacts a cylindrical surface P2 forming a principal part of an outer peripheral surface 28a of the driven gear housing 28 serving as a cylindrical section that surrounds the steering shaft 6. More specifically, the driven gear housing 28 surrounds the worm wheel 21 in which the steering shaft 6 is fitted.

The ECU 12 serving as the control device is arranged around the central axis C1 of the rotatable shaft 37 or the extension C2.

The rotatable shaft 37 in the electric motor 18 and the worm shaft 20 are coaxially arranged. The rotatable shaft 37 and the worm shaft 20 are coaxially connected to each other so that power can be transmitted via a joint 38 interposed therebetween. The joint 38 includes an annular input member 39 that rotates together with the rotatable shaft 37 in the electric motor 18, an annular output member 40 that rotates together with the worm shaft 20, and an annular elastic member 41 interposed between the input member 39 and the output member 40 for connecting the input member 39 and the output member 40 to each other so that power can be transmitted.

The worm shaft 20 is housed in a driving gear housing hole 42 in the driving gear housing 27 in the gear housing 22. The worm shaft 20 has a first end 20a and a second end 20b, and a worm 20c is formed in an intermediate portion in the axial direction of the worm shaft 20.

The first end 20a of the worm shaft 20 is rotatably supported by a first bearing 45 held in a bearing holding section 44 on the inner periphery at one end (an end on the side of the electric motor 18) of the driving gear housing hole 42. The second end 20b of the worm shaft 20 is rotatably supported by a second bearing 47 held in a bearing holding section 46 on the inner periphery at the other end of the driving gear housing hole 42.

The first bearing 45 is composed of a rolling bearing including an inner ring 48, an outer ring 49, and a plurality of rolling elements 50 interposed between the inner ring 48 and the outer ring 49. The inner ring 48 is held in the first end 20a of the worm shaft 20 together rotatably. One end surface of the inner ring 48 abuts on a positioning step provided on the outer periphery of the worm shaft 20. A small-diameter projection shaft 51 extends from the first end 20a of the worm shaft 20. The output member 40 in the joint 38 is fitted in the projection shaft 51 together rotatably and axially unmovably. The output member 40 abuts on the other end surface of the inner ring 48. The inner ring 48 is sandwiched between the positioning step in the worm shaft 20 and the output member 40. Thus, the axial movement of the inner ring 48 relative to the worm shaft 20 is regulated.

One end surface of the outer ring 49 is spaced a predetermined distance apart from and is opposite to a step adjacent to one side of the bearing holding section 44 in the driving gear housing hole 42. An annular fixing member 52 is screwed into a screw section adjacent to the other side of the bearing holding section 44 in the driving gear housing hole 42. The fixing member 52 presses the other end surface of the outer ring 49. Thus, the axial movement of the outer ring 49 is regulated.

The fixing member 52 includes a cylindrical main body 52a having a screw formed on its outer periphery, an inner flange 52b extending radially inward from one end of the main body 52a, and an outer flange 52c extending radially outward from the other end of the main body 52a. The inner flange 52b presses the other end surface of the outer ring 49. The outer flange 52c is pressed against the second interior wall surface 102 in the second housing 24 that partitions the accommodation chamber 100 that contains the ECU 12. This enables locking of the fixing member 52.

A part of the joint 38 is housed in the cylindrical main body 52a in the fixing member 52. Thus, the electric power steering apparatus 1 is miniaturized in the axial direction X1 of the rotatable shaft 37.

The second bearing 47 is composed of a rolling bearing including an inner ring 53, an outer ring 54, and a plurality of rolling elements 55 interposed between the inner ring 53 and the outer ring 54. The inner ring 53 is held in the second end 20b of the worm shaft 20 together rotatably. One end surface of the inner ring 53 abuts on a positioning step provided on the outer periphery of the worm shaft 20. Thus, the axial movement of the inner ring 53 relative to the worm shaft 20 (the movement toward the first bearing 45) is regulated.

A screw section 56 is formed in an inlet of the driving gear housing hole 42 adjacent to the bearing holding section 46 in the driving gear housing hole 42, and a preload applying member 57 for collectively applying a preload to the first and second bearings 45 and 47 is screwed into the screw section 56. The preload applying member 57 has a disk-shaped main body 58, and a screw section 59, which is screwed into the screw section 56, is formed on the outer periphery of the main body 58. An annular projection 60 for pressing one end surface of the outer ring 54 in the second bearing 47 is formed on one end surface of the main body 58.

A tool engagement hole 61, having a polygonal shape in cross section, for example, which engages a tool for rotating the preload applying member 57 is formed on the other end surface of the main body 58. The preload applying member 57 is fixed by a lock nut 62, which is screwed into the screw section 59 in the main body 58.

Both the first and second bearings 45 and 47 that respectively support the first and second ends 20a and 20b of the worm shaft 20 are composed of a known sealed bearing. More specifically, a sealing member 63 that seals an area between an inner ring and an outer ring on both sides in the axial direction X1 of the rolling element 50 is fixed to either one of the inner ring and the outer ring. The sealing member 63 has a lip that makes sliding contact with the other ring.

Since the first and second bearings 45 and 47 that respectively support both ends of the worm shaft 20 are composed of a sealed bearing, a lubricant such as grease within the gear housing 22 does not leak out toward the accommodation chamber 100 that contains the ECU 12. In order to enhance sealing properties within the accommodation chamber 100, a liquid packing may be interposed between the screw section on the other periphery of the main body 52a in the fixing member 52 and a screw section that is screwed thereinto.

In the present embodiment, a brushless motor is used as the electric motor 18. The electric motor 18 includes the motor housing 25, and the rotor 64 and a stator 65 that are housed in the motor housing 25.

The rotor 64 includes an annular rotor core 66 attached to the outer periphery of the rotatable shaft 37 together rotatably, and a rotor magnet 67 composed of an annular permanent magnet, for example, attached to the outer periphery of the rotor core 66 together rotatably. The rotor magnet 67 has a plurality of magnetic poles arranged in its circumferential direction. The N and S poles are alternately switched in the circumferential direction of the rotor 64.

The stator 65 is fixed to the inner periphery of the motor housing main body 26 in the motor housing 25. The stator 65 includes a stator core 68 fixed to the inner periphery of the motor housing main body 26 and a plurality of coils 69. The stator core 68 includes an annular yoke, and a plurality of teeth projecting radially inward from the inner periphery of the yoke. The coils 69 are respectively wound around the corresponding teeth 69.

A bus bar 71 having an annular shape or a C shape is housed within a motor chamber 70 that is defined by the motor housing main body 26 in the motor housing 25 and the first housing 23. The coils 69 respectively wound around the teeth 69 are connected to the bus bar 71. The bus bar 71 is a conductive connection member used for a connection of each of the coils 69 and a current application line. The bus bar 71 functions as a power distribution member for distributing power from a power supply source (not illustrated) among the coils 69.

A rotational position detecting sensor 72 for detecting the rotational position of the rotor 64 is housed within the motor chamber 70 that is defined by the motor housing main body 26 in the motor housing 25 and the first housing 23. The rotational position detecting sensor 72 includes a stator 73 fixed to the first housing 23 and a rotor 74 attached to the rotatable shaft 37 together rotatably. A resolver, for example, can be used as the rotational position detecting sensor 72. A Hall element can also be used.

The rotational position detecting sensor 72 may be arranged between the rotor core 66 of the rotor 64 in the electric motor 18 and the second inner wall surface 102 (corresponding to an inner bottom surface) of the second housing 24 in the axial direction X1 of the rotatable shaft 37 in the electric motor 18. The rotational position detecting sensor 72 may be arranged within the motor chamber 70, as in the embodiment, or within a cylindrical section 89, described below, provided at the center of the first housing 23 that defines the accommodation chamber 100 in the ECU 12.

Referring to FIG. 4, the rotatable shaft 37 is rotatably supported by a third bearing 75 and a fourth bearing 76 that are held by the first housing 23 shared by a part of the motor housing 25 and a part of the housing H for housing the ECU 12. The third and fourth bearings 75 and 76 are composed of a sealed bearing having the same configuration as that of the first and second bearings 45 and 47.

The first housing 23 that is a part of the housing H that partitions the accommodation chamber 100 that contains the ECU 12 includes as a bottom wall a partition wall 77 that separates the accommodation chamber 100 and the motor chamber 70. The partition wall 77 is provided with the first interior wall surface 101. A cylindrical projection 104 extends toward the motor housing main body 26 from the vicinity of the outer periphery of the partition wall 77, and one end of the motor housing main body 26 is fitted in the outer periphery of the cylindrical projection 104.

The partition wall 77 has a holding hole 105 for holding an outer ring in the third bearing 75. A cylindrical projection 106 extending toward the motor housing main body 26 from the partition wall 77 is formed coaxially with the holding hole 105. The cylindrical projection 106 has a smaller diameter than that of the cylindrical projection 104 that engages with the motor housing main body 26. The stator 73 in the rotational position detection device 72 is fixed to the inner periphery of the cylindrical projection 106.

The cylindrical section 89 extending toward the second housing 24 from the partition wall 77 is formed coaxially with the holding hole 105. An outer ring in the fourth bearing 76 is held in the inner periphery of the cylindrical section 89. An annular flange 107 extending radially inward is provided to extend at one end of the cylindrical section 89. One end of the outer ring in the fourth bearing 76 abuts on the annular flange 107 so that the axial movement of the outer ring in the fourth bearing 76 relative to the cylindrical section 89 is regulated.

On the other hand, an inner ring in the fourth bearing 76 is sandwiched between an annular positioning step formed on the outer periphery of the rotatable shaft 37 and an end surface of the input member 39 in the joint 38 so that the axial movement of the inner ring in the fourth bearing 76 relative to the rotatable shaft 37 is regulated.

A power substrate 78 and a control substrate 79 that constitute a part of the ECU 12 are housed and held in the accommodation chamber 100. At least a part of a power circuit for driving the electric motor 18 is mounted on the power substrate 78. For example, a switching element such as a field effect transistor (FET) serving as a heat generation element is mounted. The bus bar 71 connected to each of the coils 69 is connected to the power substrate 78 via a bus bar terminal 80 inserted through the partition wall 77 in the first housing 23 and entering the accommodation chamber 100.

The rotational position detecting sensor 72 is connected to a control substrate 79 via an internal signal wire including a bus bar terminal 81, which is inserted through the partition wall 77 in the first housing 23 and enters the accommodation chamber 100.

Within the accommodation chamber 100, the power substrate 78 having the power circuit mounted thereon is arranged relatively in close proximity to the first interior wall surface 101 out of the first interior wall surface 101 and the second interior wall surface 102. More specifically, the partition wall 77 includes a thick-walled section 77a having a relatively large thickness t1 and a thin-walled section 77b having a relatively small thickness t1 in the axial direction X1 of the rotatable shaft 37 in the electric motor 18. The thick-walled section 77a projects into the accommodation chamber 100. The power substrate 78 is arranged in close proximity to the first interior wall surface 101 in the thick-walled section 77a or in contact as in the present embodiment. More specifically, a portion, in the thick-walled section 77a, of the first interior wall surface 101 forms a seat section 103 receiving the power substrate 78.

In the present embodiment, the power substrate 78 is in contact with the first interior wall surface 101 in the thick-walled section 77a so that heat can be conducted, and the thick-walled section 77a functions as a heat sink for releasing heat from the power substrate 78.

The input member 39 in the joint 38 includes a cylindrical section 39a that is fitted in an end of the rotatable shaft 37 in the electric motor 18 together rotatably. The control substrate 79 is arranged around the cylindrical section 39a in the input member 39. More specifically, the cylindrical section 39a is inserted through an insertion hole 79a at the center of the control substrate 79.

The control substrate 79 is arranged between the second interior wall surface 102 in the second housing 24 and the power substrate 78 in the axial direction X1 of the rotatable shaft 37 in the electric motor 18. The power substrate 78 and the control substrate 79 are spaced a predetermined distance apart from each other in the axial direction X1 of the rotatable shaft 37 in the electric motor 18. The electric power steering apparatus 1 is laid out so that respective parts of the control substrate 79 and the joint 38 overlap each other in a direction along the central axis C1 of the rotatable shaft 37 in the electric motor 18.

Within the accommodation chamber 100, a housing space S1 formed between the thin-walled section 77b in the partition wall 77 in the first housing 23 and the control substrate 79 has a sufficient height in the axial direction X1 of the rotatable shaft 37 in the electric motor 18. The housing space 51 houses tall components such as capacitors 85 and a relay 86 as illustrated in FIG. 5, described below, and an inner space of the accommodation chamber 100 is effectively used, which is not illustrated in FIG. 4.

Then referring to an exploded perspective view of FIG. 5, a power circuit 82 for driving the electric motor 18 is mounted on the power substrate 78. The power circuit 82 mounted on the power substrate 78 includes a plurality of field effect transistors (FETs) 83 serving as heat generation elements. The power substrate 78 is composed of a multilayer substrate having a circuit mounted on its one surface. The multilayer substrate includes a highly heat-conductive plate (not illustrated) composed of an aluminum plate, for example, in surface contact with the thick-walled section 77a serving as a heat sink.

A control circuit 84 for controlling the power circuit 82 for driving the electric motor 18 is mounted on the control substrate 79. The control circuit 84 mounted on the control substrate 79 is arranged around the central axis C1 of the rotatable shaft 37 in the electric motor 18 (or the extension C2 of the central axis C1). The control circuit 84 includes a driver for controlling each of the FETs 83 in the power circuit 82 and a central processing unit (CPU) for controlling the driver.

The ECU 12 includes a plurality of capacitors 85 for removing a ripple of a current flowing through the electric motor 18, the relay 86 for cutting off the current flowing through the electric motor 18, as needed, and other non-heat generation elements. The capacitors 85 and the relay 86 constitute a sub-assembly supported by an annular holder made of synthetic resin (not illustrated) as the non-heat generation elements, and can be collectively attached to the first housing 23.

The first housing 23 is a member in a substantially square box shape whose one end opens. More specifically, the first housing 23 includes a main body 87 having a substantially square box shape whose one end opens. The main body 87 includes an outer peripheral wall 92 having a substantially square annular shape, a flange 88 having a square annular shape that protrudes radially outward from one end of the outer peripheral wall 92, and the partition wall 77 serving as the bottom wall.

Within the accommodation chamber 100, a cylindrical section 89 extending toward the opening side of the main body 87 (on the side of the second housing 24) is formed at the center of the partition wall 77. The outer peripheral wall 92 extends from an outer peripheral edge of the partition wall 77, to surround the cylindrical section 89. The main body 87 and the cylindrical section 89 are integrally formed of a single member.

An end surface 88a (an upper surface in FIG. 5) of the flange 88 is formed into a plane. The sealing member 95 contacts the end surface 88a. The flange 88 includes a plurality of (a pair of) bracket-shaped mounting sections 96 projecting radially outward. Each of the mounting sections 96 has a screw insertion hole 97, which penetrates the mounting section 96 in the thickness direction, formed therein. The above-mentioned fixing screw 91 for fastening the first and second housings 23 and 24 is inserted through each of the screw insertion holes 97.

The outer peripheral wall 92 having a square annular shape has four sidewalls 111 to 114, and the pair of mounting sections 96 is provided to extend at ends of the opposite sidewalls 111 to 113. The thick-walled section 77a in the partition wall 77, functioning as a heat sink, connects to an inner surface of the one sidewall 111 from which the mounting section 96 extends.

A portion, in the thick-walled section 77a, of the first interior wall surface 101 forms the seat section 103 receiving the power substrate 78. The seat section 103 is in contact with the power substrate 78 including the FETs 83 serving as the heat generation elements so that heat can be conducted. Heat from the heat generation element is released toward the gear housing 22 integrated with the second housing 24 from the power substrate 78 via the thick-walled section 77a serving as a heat sink and the mounting section 96.

An area of contact with the second housing 24 is made wider in the mounting section 96 used for fastening by the fixing screw 91 than in the other portion of the flange 88. The thick-walled section 77a serving as a heat sink having a large heat capacity connects to the sidewall 111 from which the mounting section 96 extends.

According to the present embodiment, the first housing 23 that is at least a part of the motor housing 25 and the second housing 24 that contacts the first housing 23 constitute the accommodation chamber 100 that contains the ECU 12. More specifically, no other housing is interposed between the first housing 23 and the second housing 24. Therefore, miniaturization can be achieved. This results in superior properties for loading in the vehicle.

Moreover, the rotational position detecting sensor 72 for detecting the rotational position of the rotor 64 in the electric motor 18 and the ECU 12 can be easily connected to each other via only a signal wire having a small path length, serving as an internal signal wire, including the bus bar terminal 81. More specifically, the rotational position detecting sensor 72 is arranged between the rotor 64 in the electric motor 18 and the second inner wall surface 102 in the second housing 24 in the axial direction X1 of the rotatable shaft 37 in the electric motor 18, so that the rotational position detecting sensor 72 can be arranged closer to the ECU 12. As a result, the rotational position detecting sensor 72 and the ECU 12 can be easily connected to each other by the internal signal wire having a small path length including the bus bar terminal 81. Therefore, the electric power steering apparatus 1 is less easily affected by radio noise than in a conventional case where an external wiring having a large path length is used. The number of wiring members for the external wiring can be reduced, so that a wiring structure can be simplified.

The second interior wall surface 102 in the second housing 24 that partially partitions the accommodation chamber 100 includes an annular plane that is perpendicular to the central axis C1 of the rotatable shaft 37 in the electric motor 18 (or the extension C2 of the central axis C1) and surrounds the central axis C1 (or the extension C2). More specifically, there is no unnecessary protrusion into the accommodation chamber 100 in the axial direction X1 of the rotatable shaft 37 in the electric motor 18. Even if the accommodation chamber 100 is small in size in the axial direction X1, a sufficient inner volume can be ensured as the accommodation chamber 100. Therefore, the electric power steering apparatus 1 can be made as small in size as possible.

The electric power steering apparatus 1 has the following advantages because the second housing 24 is the gear housing 22 that houses the speed reduction mechanism 19 serving as the transmission mechanism for transmitting power from the electric motor 18 to the steering mechanism 4. More specifically, the ECU 12 usually includes the heat generation element such as the switching element (FET 83) mounted on the power substrate 78 as in the present embodiment. On the other hand, the speed reduction mechanism 19 hardly generates heat. Heat from the heat generation element can be effectively released from the interior of the accommodation chamber 100 to the outside via the gear housing 22 that houses the speed reduction mechanism 19.

The electric power steering apparatus 1 can be made smaller in size because respective parts of the control substrate 79 and the joint 38 overlap each other in a direction along the central axis C1 of the rotatable shaft 37 in the electric motor 18.

The extension surface P1 of the annular plane forming the second interior wall surface 102 intersects, as illustrated in FIG. 4, or contacts the cylindrical surface P2 forming a principal portion of the outer peripheral surface 28a of the driven gear housing 28 serving as the cylindrical section that surrounds a shaft for transmitting a steering force (corresponding to the steering shaft 6 in the present embodiment). Therefore, the accommodation chamber 100 is arranged sufficiently closer to the steering shaft 6 in the axial direction X1 of the rotatable shaft 37 in the electric motor 18. Therefore, the electric power steering apparatus 1 can be made smaller in size in the axial direction X1 of the rotatable shaft 37.

The shaft for transmitting the steering force is not limited to the above-mentioned steering shaft 6. It may be the pinion shaft 13 or the rack shaft 14 in the rack-and-pinion mechanism serving as the steering mechanism 4. In the former case, a cylindrical surface forming a principal portion of an outer peripheral surface of cylindrical pinion housing (not illustrated) that surrounds the pinion shaft 13 and the extension surface P1 intersect or contact each other. In the latter case, a cylindrical surface forming a principal portion of an outer peripheral surface of a cylindrical rack housing (not illustrated) that surrounds the rack shaft 14 and the extension surface P1 intersect or contact each other.

The ECU 12 serving as the control device is arranged around the central axis C1 of the rotatable shaft 37 in the electric motor 18 or the extension C2 of the central axis C1. Therefore, the inner space of the accommodation chamber 100 can be effectively used to arrange the ECU 12, and thus the electric power steering apparatus 1 can be made smaller in size in the axial direction X1 of the rotatable shaft 37.

The first housing 23 includes the partition wall 77 that separates the accommodation chamber 100 and the motor chamber 70, and the power substrate 78 is provided in relatively close proximity to the first interior wall surface 101 in the partition wall 77. Particularly, the power substrate 78 is in contact with the first interior wall surface 101 in the thick-walled section 77a in the partition wall 77 so that heat can be conducted. Therefore, the thick-walled section 77a in the partition wall 77 in the first housing 23 is used as a heat sink so that heat from the power substrate 78 having the heat generation element such as the FET 83 can be effectively released from the first housing 23 toward the second housing 24 that contacts the first housing 23.

Within the accommodation chamber 100, the housing space S1 opposite to the thin-walled section 77b in the partition wall 77 in the first housing 23 has a sufficient height in the axial direction X1 of the rotatable shaft 37 in the electric motor 18. Therefore, the housing space S1 houses tall components such as the capacitors 85 and the relay 86 illustrated in FIG. 5 so that the inner space of the accommodation chamber 100 is effectively used.

Figure 7:
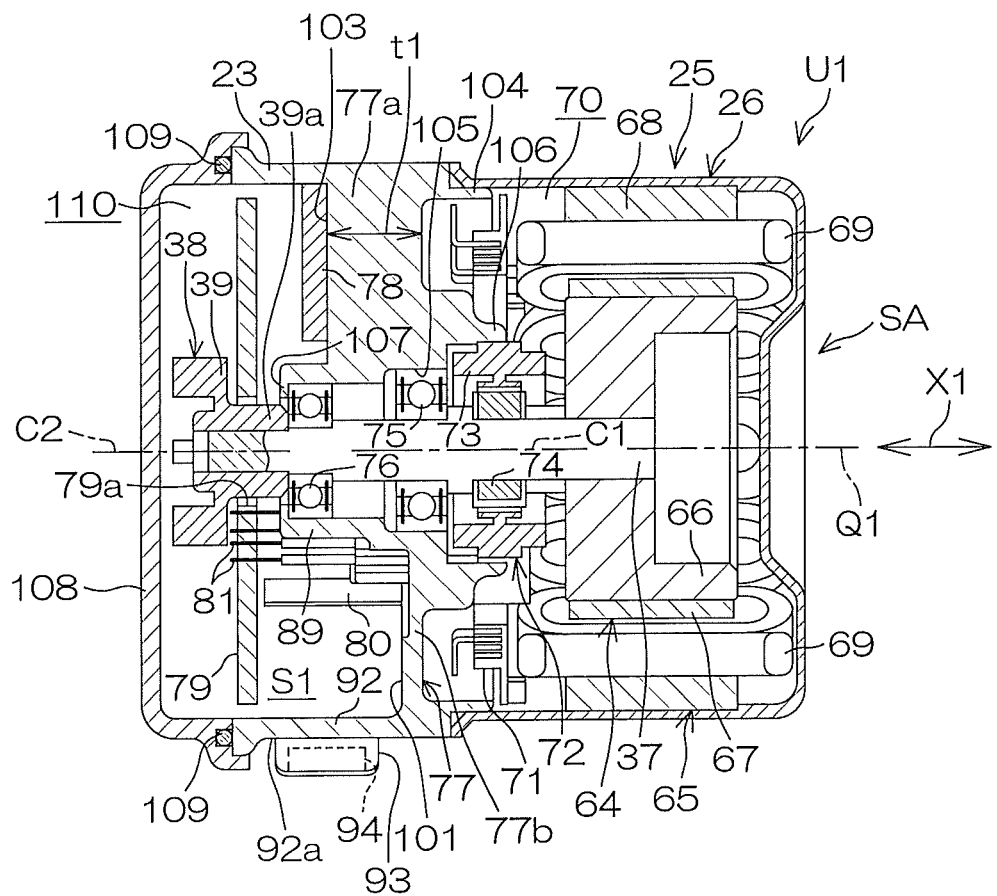
FIG. 7 is a cross-sectional view illustrating the step of transferring a unit including a sub-assembly in an electric power steering apparatus in a method for manufacturing the electric power steering apparatus.
Figure 8:
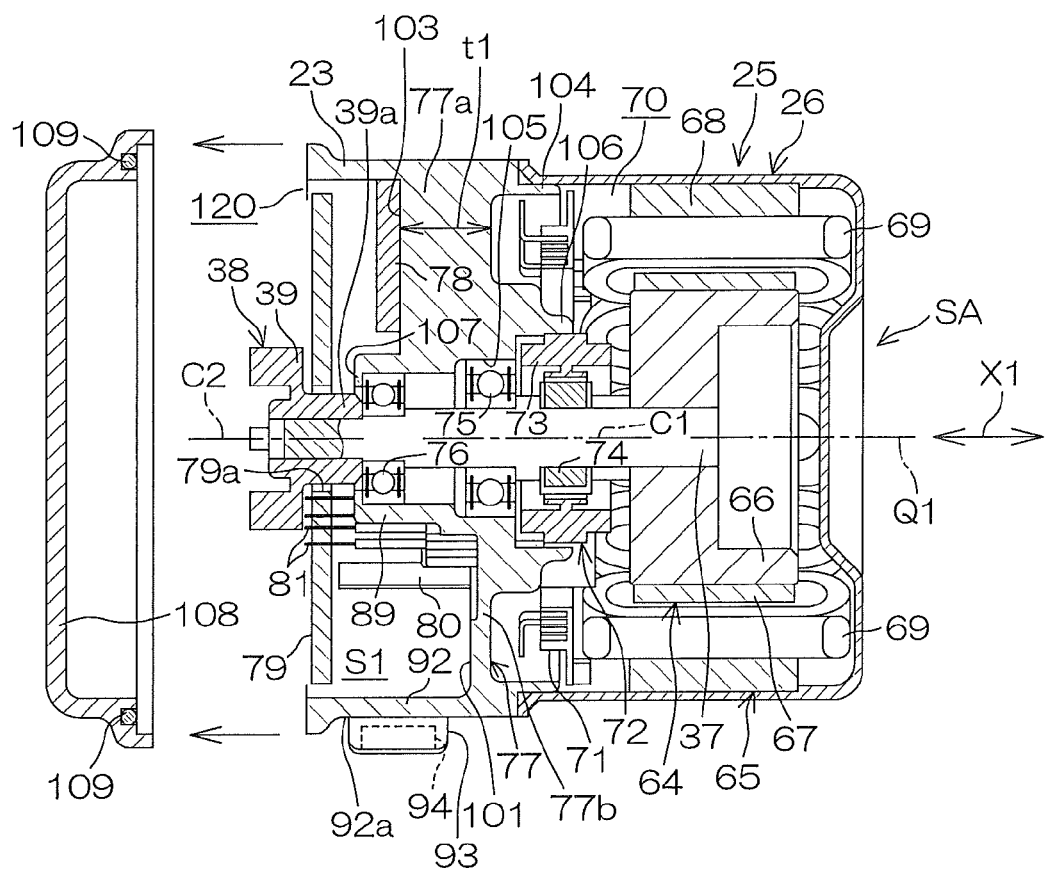
FIG. 8 is a cross-sectional view illustrating the step of removing a cover from a unit transferred, as illustrated in FIG. 7.

FIGS. 7 and 8 illustrate steps included in a method for manufacturing the electric power steering apparatus 1. In assembling the electric power steering apparatus 1, a unit U1 in which a cover 108 is combined with a sub-assembly SA including the electric motor 18 and the ECU 12 is first assembled, as illustrated in FIG. 7. More specifically, the sub-assembly SA includes the first housing 23 and the ECU 12 in a state where it is separated from the second housing 24.

In the unit U1, the cover 108 in a square box shape covering an opening section 120 (see FIG. 8) in the first housing 23 is fitted, for example, in an end of the first housing 23. The ECU 12 is contained in an accommodation chamber 110 that is defined between the cover 108 and the first housing 23. Thus, the ECU 12 can be protected when the unit U1 including the sub-assembly SA is transferred in the state illustrated in FIG. 7.

The cover 108 is then removed from the sub-assembly SA in the unit U1, as illustrated in FIG. 8, before the first housing 23 in the sub-assembly SA is assembled into the second housing 24.

In a portion where the cover 108 and the first housing 23 are fitted to each other, a sealing member 109 for sealing an area therebetween can be arranged.

Figure 9:
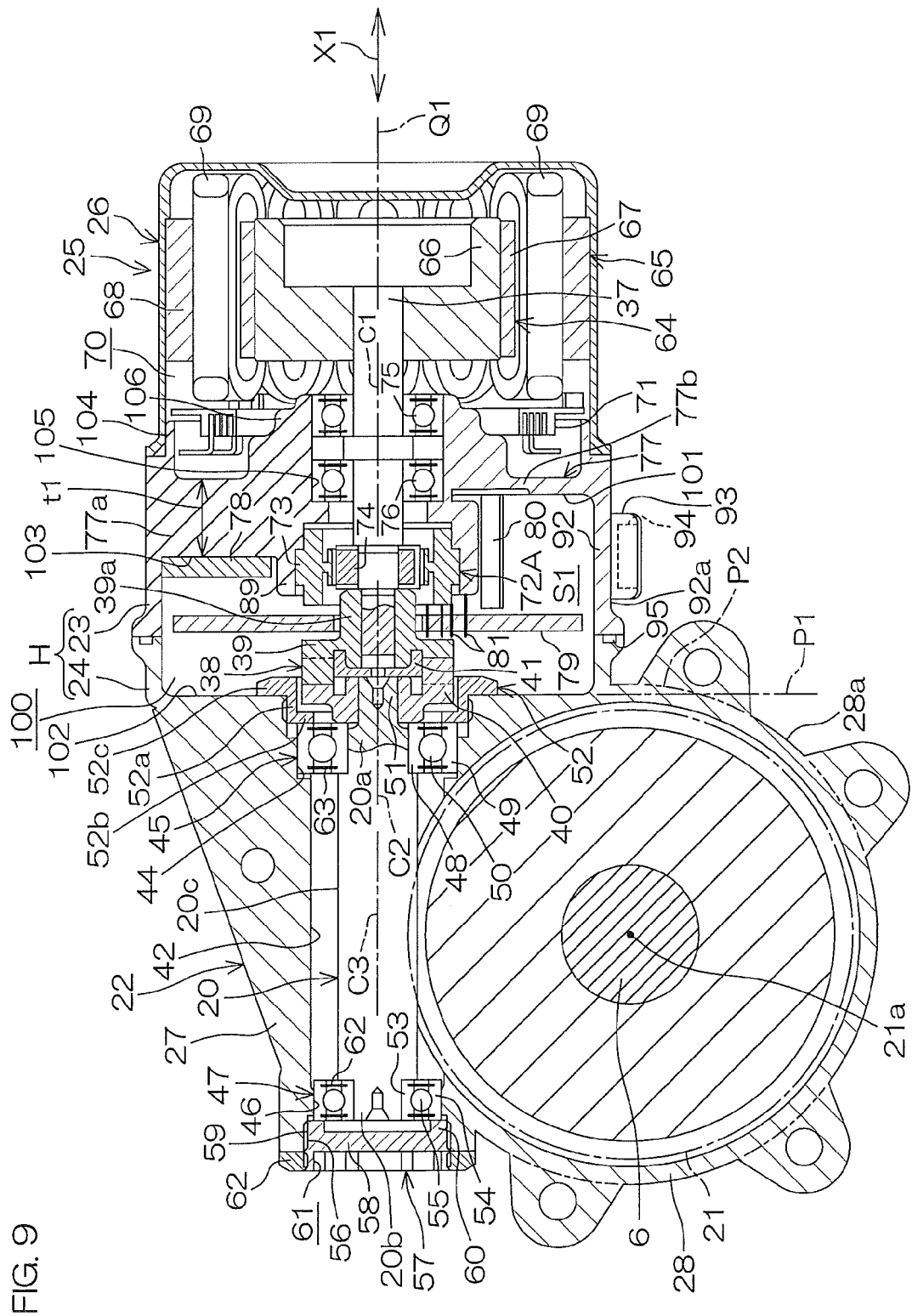
FIG. 9 is a cross-sectional view of a steering assist mechanism according to another embodiment of the present invention.

Although in the embodiment illustrated in FIG. 4, the rotational position detecting sensor 72 is arranged within the cylindrical projection 106 that projects into the motor chamber 70 from the partition wall 77 in the first housing 23, a rotational position detecting sensor 72A may be arranged within the cylindrical section 89 that projects into the accommodation chamber 100 from the partition wall 77, as illustrate in FIG. 9. In this case, the third bearing 75 and the fourth bearing 76 that support the rotatable shaft 37 in the electric motor 18 are respectively arranged within the cylindrical projection 106 that projects into the motor chamber 70 and the holding hole 105 in the partition wall 77, as illustrated in FIG. 9, for example.

In an embodiment illustrated in FIG. 9, the same effect as that in the embodiment illustrated in FIG. 4 can also be produced. A rotational position detecting sensor 72A is arranged within a cylindrical section 89 that projects toward an accommodation chamber 100. The position of a stator 73 in the rotational position detecting sensor 72A can be adjusted from the exterior in a circumferential direction of the cylindrical section 89 in the state of the above-mentioned sub-assembly SA, for example.

Figure 10:
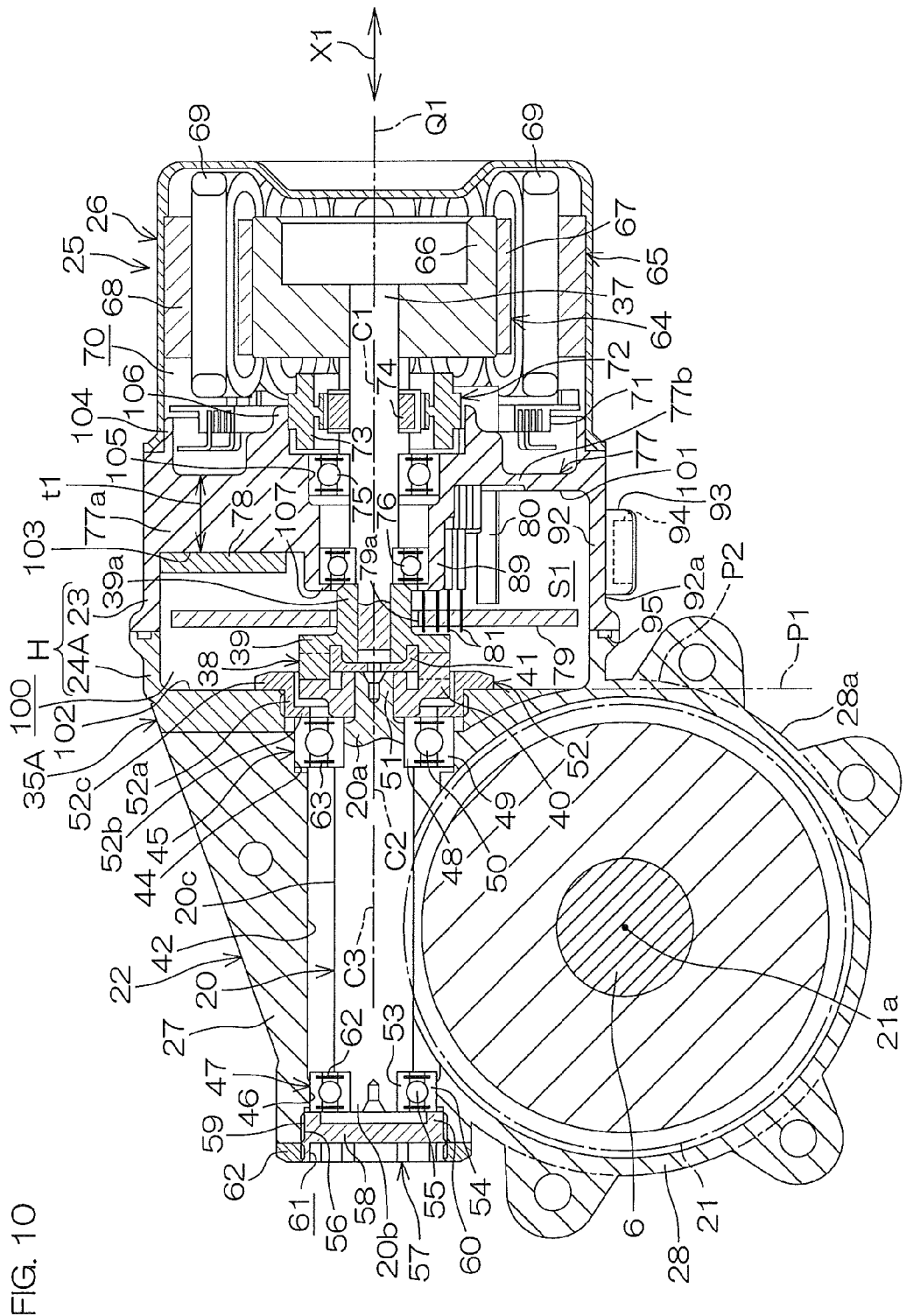
FIG. 10 is an illustrative sectional view of a steering assist mechanism, cut in an axial direction of an electric motor in still another embodiment of the present invention.

Although in the above-mentioned embodiment, the second housing 24 and the gear housing 22 are combined with each other, the present invention is not limited to the same. As illustrated in FIG. 10, the second housing 24A and the sensor housing 35A may be combined with each other. More specifically, the second housing 24A is formed of a single material integrally with the sensor housing 35A. In this case, heat from the heat generation element such as the FET 83 can be effectively released from the interior of the accommodation chamber 100 to the outside via the sensor housing 35A that houses the torque sensor 11 serving as the steering state detecting sensor. In FIG. 10, the same constituent elements as those illustrated in FIG. 4 are respectively assigned the same reference numerals.

A housing that houses a steering angle sensor serving as a steering state detecting sensor for detecting the steering angle of the steering wheel 2 and the above-mentioned second housing may be combined with each other, which is not illustrated.

Figure 11:
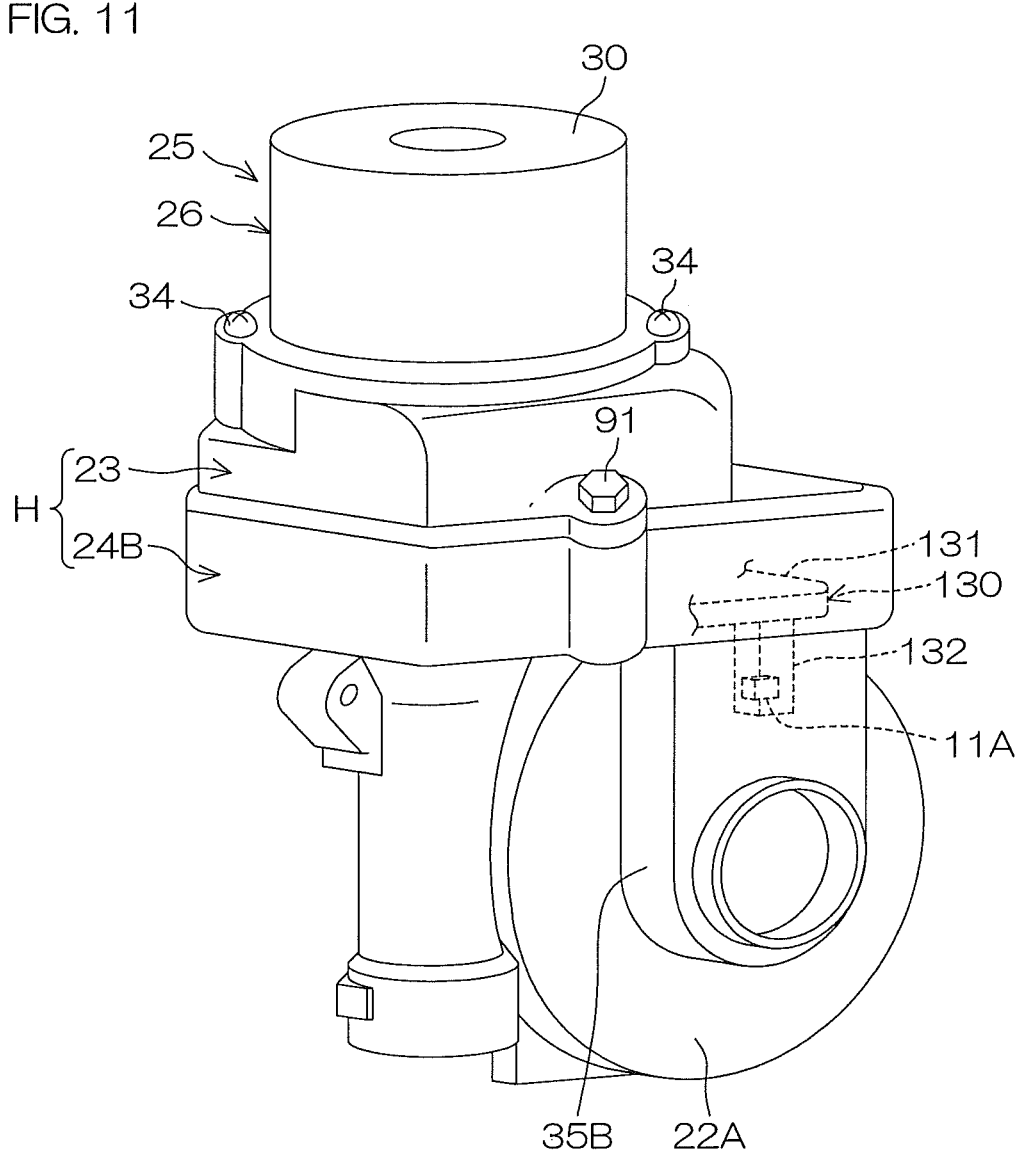
FIG. 11 is a schematic perspective view of a steering assist mechanism in a further embodiment of the present invention.
Figure 12:
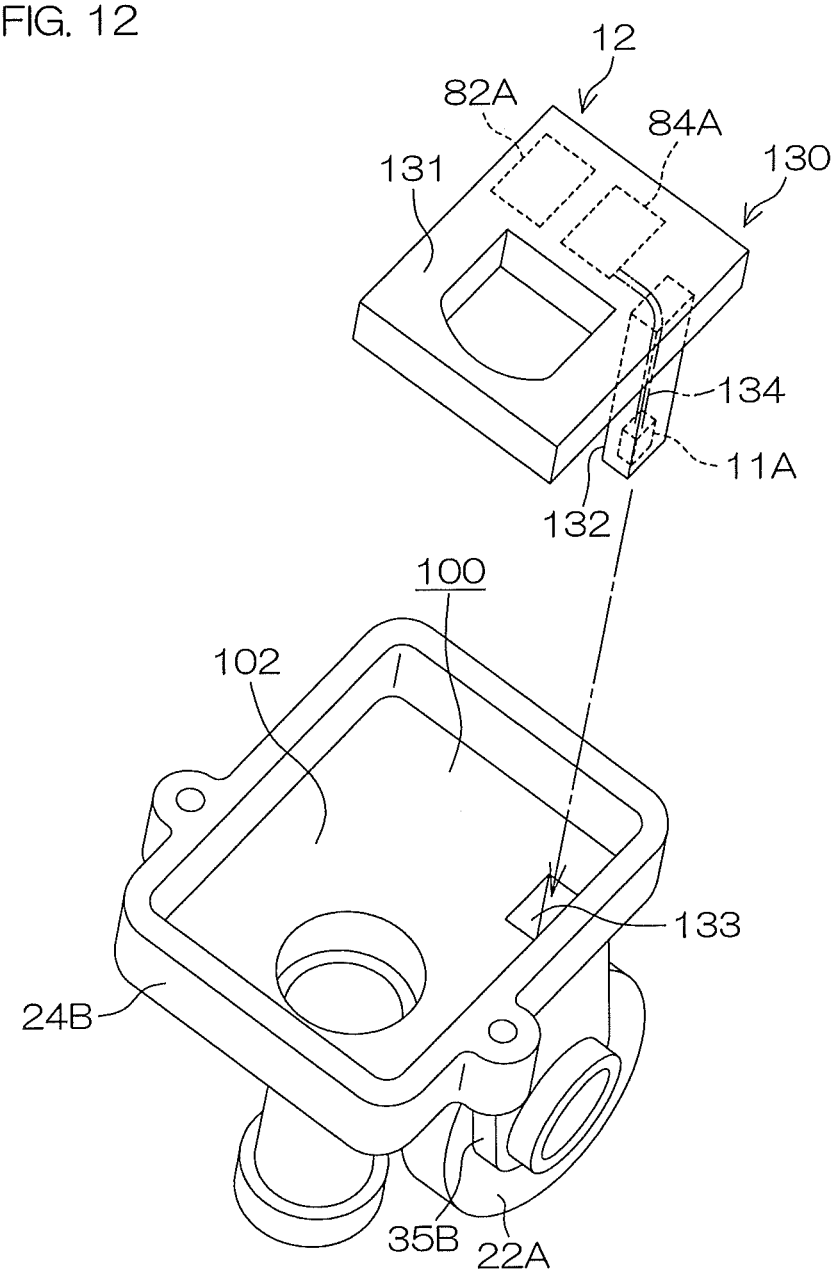
FIG. 12 is an exploded perspective view of a holding unit that holds a torque sensor serving as a steering state detecting sensor and a second housing in the embodiment illustrated in FIG. 11.

FIGS. 11 and 12 illustrate still another embodiment of the present invention. Referring to FIGS. 11 and 12, in the present embodiment, a second housing 24B that is combined with a first housing 23 forming a part of a motor housing 25 in an electric motor 18 is a part of a housing that houses a torque sensor 11A serving as a steering state detecting sensor. The second housing 24B is a part of a housing that houses a speed reduction mechanism serving as a transmission mechanism. More specifically, in the second housing 24B, a part 22A of a gear housing and a sensor housing 35B are integrally formed of a single material, as illustrated in FIG. 11.

The torque sensor 11A is formed using a Hall element, for example. The torque sensor 11A is held by a holding unit 130. More specifically, the holding unit 130 includes a main body 131 arranged within an accommodation chamber 100, and a holding section 132 composed of a projection that projects from the main body 131.

As illustrated in FIG. 12, the main body 131 is fixed on a second inner wall surface 102, for example, within an accommodation chamber 100. Parts of components composing a power circuit or a control circuit can be held in the main body 131. A holding section 132 extends to a detection position in close proximity to the outer periphery of the steering shaft 6, for example, via a holding hole 133 penetrating the second inner wall surface 102.

A torque sensor 11A and a signal wire 134 from the torque sensor 11A are held in the holding section 132. More specifically, the torque sensor 11A and the signal wire 134 are resin molded by the holding section 132. The main body 131 and the holding section 132 are integrally formed using resin.

The signal wire 134 is connected to a part 84A of the control circuit, for example, serving as a part of an ECU 12 arranged in the main body 131. A part 82A of the power circuit is arranged in the main body 131, and also functions as a power supply module.

In the present embodiment, the holding section 132 is inserted through the holding hole 133 that is inserted through the second inner wall surface 102 so that the single line 134 from the torque sensor 11A serving as a steering state detecting sensor is connected to the ECU 12 within the accommodation chamber 100 via the inside of the second housing 24B that houses the torque sensor 11A.

Therefore, the torque sensor 11A and the ECU 12 can be easily connected to each other by the internal signal wire 134 (e.g., a bus bar) having a small path length. Therefore, the electric power steering apparatus 1 is less easily affected by radio noise than in a conventional case where an external wiring having a large path length is used. The number of wiring members for the external wiring can be reduced, so that a wiring structure can be simplified.

The holding unit 130 for holding the torque sensor 11A includes the main body 131, and the holding section 132 that extends from the main body 131 and holds the torque sensor 11A and the signal wire 134. Therefore, work for containing the main body 131 in the holding unit 130 in the accommodation chamber 100 and work for inserting the holding section 132 that holds the torque sensor 11A and the signal wire 134 through the holding hole 133 can be simultaneously performed, resulting in significantly easy assembling work.

The torque sensor 11A and the signal wire 134 are resin molded by the holding section 132. Therefore, the holding unit 130, which is superior in positional accuracy and is easy to handle, in the torque sensor 11A can be realized. Insert molding is used so that the manufacturing is easy.

The present invention is not limited to each of the above-mentioned embodiments. Various changes can be made. Although in each of the above-mentioned embodiments, the present invention is applied to an electric power steering apparatus of a so-called column assist type, the present invention is not limited to the same. The present invention may be applied to an electric power steering apparatus of a so-called pinion assist type, and an electric power steering apparatus of a so-called rack assist type.

Although in each of the above-mentioned embodiments, the present invention is applied to an electric power steering apparatus for outputting power from an electric motor as a steering assist force, the present invention is not limited to the same. For example, the present invention may be applied to a vehicle steering apparatus of a transfer ratio variable type including a transfer ratio variable mechanism capable of changing the ratio of the steering angle of a steerable wheel to the steering angle of a steering member and using the output of the electric motor to drive the transfer ratio variable mechanism, and a steer-by-wire vehicle steering apparatus in which mechanical connection between the steering member and the steerable wheel is released to steer the steerable wheel at the output of an electric motor.

At least a part of the power substrate 78 and the control substrate 79 in the ECU 12 may be resin molded.

While the invention has been described in detail with respect to specific embodiments thereof, it will be appreciated that those skilled in the art, upon attaining an understanding of the foregoing, may readily conceive of alternations to, variations of, and equivalents to these embodiments. Accordingly, the scope of the present invention should be assessed as that of the appended claims and any equivalents thereto.

This application claims priority from Japanese Patent Applications No. 2008-031113 filed with the Japanese Patent Office on Feb. 12, 2008 and No. 2008-091655 filed with the Japanese Patent Office on Mar. 31, 2008, the disclosures of which are hereinto incorporated by reference.

The invention claimed is:

1. A vehicle steering apparatus, comprising:
   an electric motor composed of a brushless motor including a rotor and a stator;
   a rotational position detecting sensor that detects a rotational position of the rotor;
   a steering state detecting sensor for detecting a steering state;
   a control device controls driving of the electric motor based on respective detection signals from the rotational position detection sensor and the steering state detecting sensor;
   an accommodation chamber that accommodates the control device, the accommodation chamber being defined by a first housing that is at least a part of a motor housing in the electric motor and a second housing that contacts the first housing;
   the second housing being a part of a sensor housing that houses a steering state detecting sensor for detecting a steering state;
   a signal wire from the steering state detecting sensor connecting to the control device disposed within the accommodation chamber inside the sensor housing; and
   a holding unit holding the steering state detecting sensor, including a main body arranged within the accommodation chamber, and a holding section extending from the main body to a detection position via a holding hole that passes through the second interior wall surface,
   wherein the steering state detecting sensor and the signal wire from the steering state detecting sensor are held in the holding section.

2. The vehicle steering apparatus according to claim 1, wherein
   the first housing includes a first interior wall surface that partially partitions the accommodation chamber,
   the second housing includes the second interior wall surface that partially partitions the accommodation chamber,
   the first interior wall surface and the second interior wall surface are opposite o each other in an axial direction of a rotatable shaft in the electric motor, and
   the rotational position detecting sensor is arranged between the rotor and the second interior wall surface in the axial direction of the rotatable shaft in the electric motor.

3. The vehicle steering apparatus according to claim 1, wherein the second housing is a part of a housing that houses a transmission mechanism that transmits the power of the electric motor to a steering mechanism.

4. The vehicle steering apparatus according to claim 3, wherein
the transmission mechanism includes a driving member and a driven member that is driven by the driving member,
a joint that coaxially connects a rotatable shaft in the electric motor and the driving member in the transmission mechanism,
the control device includes a control substrate having a control circuit for controlling a power circuit for driving the electric motor mounted thereon, and
at least respective parts of the control substrate and the joint overlap each other in a direction along a central axis of the rotatable shaft in the electric motor.

5. The vehicle steering apparatus according to claim 1, wherein
the steering state detecting sensor and the signal wire are resin molded by the holding section.

6. The vehicle steering apparatus according to claim 1, wherein
the control device is arranged around a central axis of the rotatable shaft in the electric motor or an extension of the central axis of the rotatable shaft.

7. The vehicle steering apparatus according to claim 1, wherein
a sub-assembly includes the control device and the first housing,
the first housing houses at least a part of the control device, and
an opening section that faces the control device is formed in the first housing of the sub-assembly when the first housing is removed from the second housing.

8. The vehicle steering apparatus according to claim 7, wherein
the first housing includes a partition wall that partitions the accommodation chamber and a motor chamber in the electric motor, and a cylindrical section that projects into the accommodation chamber from the partition wall,
a rotatable shaft in the electric motor is inserted through the cylindrical section, and
the rotational position detecting sensor includes a rotational position detecting sensor that is arranged within the cylindrical section.

9. A method for manufacturing a vehicle steering apparatus, comprising the steps of:
transferring a unit including a sub-assembly of the vehicle steering apparatus, the vehicle steering apparatus comprising:
an electric motor composed of a brushless motor including a rotor and a stator;
a rotational position detecting at detects a rotational position of the rotor;
a steering state detecting sensor for detecting a steering state;
a control device that controls driving of the electric motor based on respective detection signals from the rotational position detection sensor and the steering state detecting sensor;
an accommodation chamber that accommodates the control device, the accommodation chamber being defined by a first housing that is at least apart of a motor housing in the electric motor and a second housing that contacts the first housing;
wherein the sub-assembly includes the control device and the first housing;
the first housing houses at least a part of the control device; and
an opening section facing the control device is formed in the first housing in the sub-assembly when the first housing is removed from the second housing; and
wherein at least one of the rotational position detecting sensor and the steering state detecting sensor is connected to the control device via only a signal wire in the first housing or the second housing, and
a cover that covers the opening section in the first housing in the sub-assembly; and
removing the cover from the sub-assembly in the transferred unit before the first housing in the sub-assembly is assembled into the second housing.

10. A vehicle steering apparatus, comprising:
an electric motor extending in a given direction, composed of a brushless motor including a rotor and a stator;
a rotational position detecting sensor extending in the direction, detecting a rotational position of the rotor;
a sensor housing extending perpendicularly to the direction, and having a steering state detecting sensor that detects a steering state;
a control device disposed within the accommodation chamber, and controlling driving of the electric motor based on respective detection signals from the rotational position detection sensor and the steering state detecting sensor;
a motor housing extending in the direction, and disposed in the electric motor;
a first housing extending in the direction, and being at least a part of the motor housing;
a second housing extending in the direction, contacting the first housing, being a part of the sensor housing and having a second interior wall surface;
an accommodation chamber defined by the first housing and the second housing;
a signal wire connecting the steering state detecting sensor with the control device inside the sensor housing; and
a holding unit holding the steering state detecting sensor, and including a main body arranged within the accommodation chamber, and a holding section extending from the main body to a detection position via a holding hole that passes through the second interior wall surface,
wherein the steering state detecting sensor and the signal wire from the steering state detecting sensor are held in the holding section.

* * * * *

UNITED STATES PATENT AND TRADEMARK OFFICE
CERTIFICATE OF CORRECTION

PATENT NO. : 8,689,926 B2
APPLICATION NO. : 12/867399
DATED : April 8, 2014
INVENTOR(S) : Shigeki Nagase et al.

It is certified that error appears in the above-identified patent and that said Letters Patent is hereby corrected as shown below:

In the Claims

IN CLAIM 2:

Column 18, line 60, after "opposite", change "o" to --to--.

IN CLAIM 9:

Column 19, line 55, after "position", change "detecting at" to --detecting sensor that--.
Column 20, line 7, after "at least", change "apart" to --a part--.

Signed and Sealed this
Twenty-second Day of July, 2014

Michelle K. Lee
*Deputy Director of the United States Patent and Trademark Office*